UNITED STATES PATENT OFFICE.

CHARLES C. NITCHIE, OF DEPUE, ILLINOIS, ASSIGNOR TO THE NEW JERSEY ZINC COMPANY, OF NEW YORK, N. Y., A CORPORATION OF NEW JERSEY.

PROCESS OF EXTRACTING METALS FROM THEIR ORES, &c.

1,258,934. Specification of Letters Patent. Patented Mar. 12, 1918.

No Drawing. Application filed November 19, 1915. Serial No. 62,306.

*To all whom it may concern:*

Be it known that I, CHARLES C. NITCHIE, a citizen of the United States, residing at Depue, Bureau county, State of Illinois, have invented certain new and useful Improvements in Processes of Extracting Metals from Their Ores, &c.; and I do hereby declare the following to be a full, clear, and exact description of the invention, such as will enable others skilled in the art to which it appertains to make and use the same.

This invention relates to the extraction of zinc and other valuable constituents from ores, oxids, flue dusts, fumes, and other material containing the same; and particularly to the extraction of zinc in a form substantially free from lead, and to the obtaining of lead in a form substantially free from zinc, from such materials.

This invention is based upon the discovery that by heating a mixture of the ore or other material with an ammonium salt, such as ammonium sulfate, the metallic constituents are converted into the corresponding salts, and the ammonia is evolved as a gas. By leaching the resulting product with water or other suitable solvent, those salts that are soluble can be separated from those that are insoluble, and a selective extraction and separation of the metals thus effected.

By the use of an appropriate ammonium salt, and by the proper control of the temperature during the heating process, the separation of the different valuable constituents from each other and also from certain deleterious constituents can be easily accomplished and with substantial completeness.

Moreover, the ammonia gas evolved during the heating process can be recovered and utilized either in the subsequent treatment of the metal compounds or in a subsequent heating process. The gas may thus be absorbed directly in acid to yield further amounts of the ammonium salt which is used during the heating process, or it can be absorbed or recovered in a form suitable for use as a reagent in the subsequent treatment of the extracted metals.

The invention will be further illustrated by the following specific example, showing its application to the treatment of a flue dust containing oxids of zinc, iron, lead, silver and gold, arsenic, copper and such other constituents as are usually present in such materials.

A mixture is made of this material with sufficient ammonium sulfate to produce the desired reaction, that is, to convert into sulfates the zinc, iron, lead, copper and silver. If sulfates are already present, the amount of ammonium sulfate can be decreased by an equivalent amount. In practice, it is usually advisable to use a slight excess of the ammonium salt over the amount determined by calculation from the analysis of the material to be treated in order to allow for any incidental volatilization of the ammonium salts without reaction.

The mixture is then introduced into any suitable type of furnace, for example, an appropriate muffle furnace, and is there heated to the appropriate temperature. The temperature should be raised to a point at which the reaction proceeds freely. The reactions which take place are indicated by the following equations:

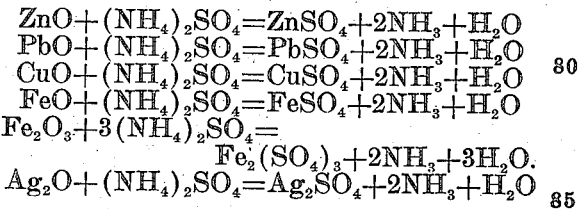

During the reaction a current of air or other gas is passed through the heating chamber to carry off the ammonia gas as fast as it is evolved, together with the arsenic oxid which is also volatilized.

The reaction commences at about 225° C. and proceeds rapidly at temperatures of about 300–350° C. Too high a temperature should be avoided as it tends to volatilize too large a proportion of the ammonium sulfate as such, with resulting incomplete sulfatization of the material being treated. At higher temperatures, also, there is danger of loss of ammonia by decomposition or dissociation into hydrogen and nitrogen. This decomposition is stated by competent authorities to begin at temperatures below 500° C. in the presence of certain metallic oxids.

During the reaction, the fused charge is vigorously agitated by the escaping gases, while the end of the reaction is indicated by the cessation of the evolution of ammonia and by the quiescence of the mixed charge.

After the reactions have ceased, the temperature may, with advantage, be raised to 600°–650° C. to secure the complete expulsion of any remaining arsenic oxids and to break up again the sulfates of iron formed in the first stage of the process. This breaking up of the iron sulfate prevents its solution during the subsequent leaching process. The temperature should not, however, be allowed to become so high as to cause decomposition of the zinc sulfate which occurs somewhat above 700° C.

During the reaction, the zinc and certain other metals are converted into the form of soluble sulfates, while the lead and certain other metals are converted into the form of insoluble sulfates. The iron sulfates which are soluble, are by the high heating, decomposed and converted into an insoluble form.

Upon leaching or extracting the furnace product with water or other suitable solvent, the soluble zinc sulfate is extracted, together with most of the copper and a small quantity of iron; while the insoluble residue retains the lead sulfate, silver sulfate, gold, most of the iron, part of the copper, and any inert material such as silica which the material treated may have contained. The solution and residue can be separated by sedimentation, filtration, or other suitable methods.

The insoluble portion, containing the lead sulfate, forms a concentrated material for treating for the recovery of lead, silver and copper. It is substantially free from zinc or arsenic, the presence of which is so detrimental in the recovery of these metals from this class of material.

The solution also contains the zinc and other dissolved metals in a form substantially free from lead, and hence can be used for the recovery of the zinc in a lead-free condition. The zinc can thus be recovered in the form of a substantially pure salt by evaporation and crystallization; or it can be obtained as a precipitated compound, with or without preliminary purification, depending upon the nature and quality of the precipitate desired, by the addition of suitable precipitating agents.

In order to obtain the zinc from its solution, it may, with advantage, be precipitated as a basic compound, such as the basic carbonate, by the addition of a solution of ammonium carbonate. This ammonium compound may in turn be made by absorbing, in water, the ammonia evolved during the first stage of the process, together with carbon dioxid, which may conveniently be obtained from furnace stack gases from the combustion of carbonaceous fuel. The ammonia gas, before absorption, is cooled by suitable means to condense the arsenical vapors and any volatilized ammonium salts which it has carried from the reaction furnace. These ammonium salts can in turn be recovered and converted into ammonia by solution in water and distillation with lime.

The basic zinc carbonate precipitate, which, if obtained from the solution without preliminary purification will contain copper and the small quantity of iron present in the solution, when separated by filtration or otherwise, and dried, forms a zinc concentrate suitable for the production of spelter of a high grade, substantially free from lead, by reduction in a spelter furnace.

The filtrate from the carbonate precipitate is a solution of ammonium sulfate from which the salt can be obtained by evaporation of the water, or by the distillation with lime and absorption of the ammonia in sulfuric acid. The ammonia can thus be recovered for further use in the process, so that the amount of the ammonium salt which is required to be added to the ore or other material at the outset of the process can be to a corresponding extent replaced. That is to say, the ammonia can be recovered and reused, with such additions as may be necessary to make up for that lost during the process.

The zinc sulfate solution can, of course, be purified, in any suitable manner, and treated for the production of the zinc salts or of metallic zinc by electro-deposition or otherwise. The zinc or zinc salts thus produced have the advantage that they are substantially free from lead.

From the above description it will be seen that the zinc is obtained from the ores or fumes or other oxidized zinc-containing materials, substantially free from lead, by a furnace operation which comprises heating the material with an ammonium salt, such as ammonium sulfate, at a temperature sufficient to convert the zinc and other metals into sulfates or other salts and to evolve or drive off the ammonia which can be recovered for further use. In order to convert the soluble iron sulfates into an insoluble form, the furnace product is heated to a higher temperature to decompose the iron sulfate without, however, decomposing the zinc sulfate.

It will also be seen that, by extracting the resulting furnace product, the soluble zinc sulfate and other soluble sulfates are extracted from the insoluble lead sulfate and other insoluble sulfates, so that there is obtained a solution of zinc sulfate substantially free from lead from which metallic zinc or zinc salts can be obtained, also free from lead, while the insoluble lead sulfate residue is itself substantially free from zinc and can accordingly be further treated for the production of zinc-free lead or lead compounds.

It will be further seen that the ammonium salt which is added as a reagent to the ore or other material is decomposed during the reaction and the ammonia driven off so that it can be recovered and used either as a reagent during a subsequent step of the process, or as a source of the primary ammonium salt to be mixed with subsequent charges of the ore. The ammonia can thus be recovered and used over and over again. It will, however, be understood that the ammonia or ammonium salts which are thus recovered can be used for other purposes and fresh amounts of the ammonium salts added to the subsequent furnace charges. The recovery and reuse of the ammonia is of advantage where there is a limited supply of ammonia, and where economy is accordingly desired.

What I claim is:

1. The method of treating ores, fumes and other metalliferous material containing zinc and iron, which comprises heating such material with ammonium sulfate to a temperature sufficient to convert the zinc and iron into sulfates and to drive off the ammonia, then heating to a higher temperature to decompose the iron sulfate without decomposing the zinc sulfate, and extracting the zinc sulfate from the resulting product.

2. The method of treating ores, fumes and other metalliferous material containing zinc and iron, which comprises heating such material with ammonium sulfate to a temperature sufficient to convert the zinc and iron into sulfates and to drive off the ammonia, then heating to a temperature of about 600 to 650 degrees C. to decompose the iron sulfate without decomposing the zinc sulfate, and extracting the zinc sulfate from the resulting product.

3. The method of treating ores, fumes and other metalliferous material containing lead, zinc and iron, which comprises heating such material with ammonium sulfate to a temperature sufficient to convert the zinc and iron into sulfates and to drive off the ammonia, then heating to a higher temperature to decompose the iron sulfate without decomposing the zinc sulfate, and extracting the zinc sulfate from the resulting product, whereby a zinc sulfate solution is obtained relatively free from lead and iron and a lead-containing residue is obtained substantially free from zinc.

4. The method of treating ores, fumes and other metalliferous material, containing lead, zinc and iron, which comprises heating such material with ammonium sulfate to a temperature sufficient to convert the zinc and iron into sulfates and to drive off the ammonia, then heating to a temperature of about 600 to 650° C. to decompose the iron sulfate without decomposing the zinc sulfate, and extracting the zinc sulfate from the resulting product and thereby obtaining a zinc sulfate solution relatively free from lead and iron and a lead-containing residue substantially free from zinc.

5. The method of treating flue dust and other metalliferous material containing lead, zinc and arsenic, and of effecting removal of arsenic therefrom, which comprises heating such material with ammonium sulfate to a temperature sufficient to convert the zinc into sulfate and to drive off the ammonia and effect removal of arsenic, and extracting the zinc sulfate from the resulting product and thereby obtaining a solution of zinc sulfate relatively free from arsenic and a lead-containing residue substantially free from zinc and arsenic.

6. The method of treating flue dust and other metalliferous material containing lead, zinc and arsenic, and of effecting removal of arsenic therefrom, which comprises heating such material with ammonium sulfate to a temperature sufficient to convert the zinc into sulfate and to drive off the ammonia and effect removal of arsenic, then heating the material to a higher temperature to effect a further removal of arsenic, and extracting the zinc sulfate from the resulting product and thereby obtaining a solution of zinc sulfate relatively free from arsenic and a lead-containing residue substantially free from zinc and arsenic.

7. The method of treating ores, fumes and other metalliferous material containing lead, zinc, iron and arsenic, and of effecting removal of arsenic therefrom, and the production of a zinc sulfate solution relatively free from lead and iron, which comprises heating such material with ammonium sulfate to a temperature sufficient to convert the zinc and iron into sulfates and to drive off ammonia and effect removal of arsenic, then heating to a higher temperature to effect a further removal of arsenic and to decompose the iron sulfate without decomposing the zinc sulfate and extracting the zinc sulfate from the resulting product, whereby a zinc sulfate solution is obtained relatively free from lead, iron and arsenic, and a lead-containing residue is obtained substantially free from zinc.

8. The method of treating ores, fumes, and other metalliferous material containing lead and zinc, and of effecting a selective separation therefrom of the zinc and other metals forming soluble sulfates, which comprises heating such material with ammonium sulfate to a temperature above 225° C. but below the temperature of decomposition of ammonia to convert the metals into sulfates and to drive off the ammonia, extracting the zinc and other soluble sulfates in a substantially lead-free condition from the resulting product, recovering the ammonia evolved during the process as ammonium carbonate by absorption, together with carbon dioxid, in water, and precipitating the zinc from its sulfate solution as a basic zinc carbonate with the recovered ammonium carbonate, and thereby obtaining a substantially lead-free zinc precipitate and regenerating ammonium sulfate; substantially as described.

9. The method of treating ores, fumes, and other metalliferous material containing lead and zinc, and of effecting a selective separation therefrom of the zinc and other metals forming soluble sulfates, which comprises heating such material with ammonium sulfate to a temperature sufficient to convert the metals into sulfates and to drive off the ammonia, then heating to a higher temperature to drive off any remaining arsenic oxid and to decompose the iron sulfates without decomposing the zinc sulfate, and extracting the soluble sulfates from the resulting product, whereby a substantially lead-free zinc is obtained in the form of a zinc sulfate solution relatively free from iron, and a substantially zinc-free residue is obtained containing the lead sulfate and most of the iron; substantially as described.

10. The method of treating ores, fumes, and other metalliferous material, containing lead and zinc, and of effecting a selective separation therefrom of the zinc and other metals forming soluble sulfates, which comprises heating such material with ammonium sulfate to a temperature sufficient to convert the metals into sulfates and to drive off the ammonia, then heating to a temperature of about 600° to 650° C. to drive off any remaining arsenic oxid and to decompose the iron sulfates without decomposing the zinc sulfate, and extracting the soluble sulfates from the resulting product, whereby a substantially lead-free zinc is obtained in the form of a zinc sulfate solution relatively free from iron, and a substantially zinc-free residue is obtained containing the lead sulfate and most of the iron; substantially as described.

In testimony whereof I affix my signature.

CHARLES C. NITCHIE.